Patented Jan. 5, 1937

2,066,453

UNITED STATES PATENT OFFICE 2,066,453

PRESERVATIVE FOR ANIMAL AND VEGETABLE SUBSTANCES

John Bleeck, London, England

No Drawing. Application October 14, 1935, Serial No. 44,998. In Great Britain November 6, 1934

3 Claims. (Cl. 149—1)

This invention relates to the preservation of animal and vegetable substances and has for its object an improved preserving process especially suitable for use with undried hides or skins, in connection with which it will be described although it is to be understood that it is not so limited.

Bacterial action, which is the cause of decay is dependent mainly on temperature and the presence in hides and skins of mechanically contained water. If the effects of temperature be ignored preservation can be effected either by drying or by replacing part of the water content by minerals in solution or by a combination of these two methods. Common salt (sodium chloride) is generally employed, but there are disadvantages arising from its use in that the protection afforded is only temporary against the destructive action of bacteria and, as a matter of precaution very large quantities have to be employed (as much as 30% by weight of the substance to be preserved) which entails considerable charges for transportation, and further its propensity to form "slush" makes its use unavoidably dirty.

By means of the improved process of preserving greater resistance against bacterial action is obtained, part of the transportation charges is eliminated whilst the method is clean and easy of application.

It has previously been proposed to preserve articles of food by treating them with a mixture including, inter alia, hydrofluoric or hydrofluosilicic acid (0.2% of the whole) sodium benzoate (1.4% of the whole) and sodium bisulphate (0.4% of the whole).

In accordance with this invention the improved process for preserving animal and vegetable substances consists in treating said substances with an aqueous solution of sodium sulphate and sodium fluoride (neutral or acid) with kaolin suspended therein, the quantity of the sodium sulphate (in terms of the decahydrate) constituting at least 30% of the solid ingredients and the quantity of sodium fluoride at least 2% thereof.

It is desirable that the quantity of sodium sulphate be decreased and the quantity of sodium fluoride be increased, with the temperature and humidity, whilst the quantity of kaolin may be increased also. Sodium silico fluoride may be included, but it is not essential.

For example, for the preservation of hides or skins the proportions of the ingredients may be under normal conditions and in temperate or mild tropical zones:—

| | Percent by weight |
|---|---|
| Sodium sulphate (commercial) | 80 to 85 |
| Sodium fluoride | 2 to 5 |
| Sodium silico fluoride | 0.25 to 2 |
| Kaolin | 12 to 17 | or under unfavourable conditions in temperate or mild tropical zones or for favourable tropical conditions:—

| | Percent by weight |
|---|---|
| Sodium sulphate (commercial) | 75 to 80 |
| Sodium fluoride | 5 to 8 |
| Sodium silico fluoride | 0.5 to 2 |
| Kaolin | 14 to 20 | for unfavourable tropical conditions:—

| | Percent by weight |
|---|---|
| Sodium sulphate (commercial) | 70 to 75 |
| Sodium fluoride | 7 to 12 |
| Sodium silico fluoride | 1 to 3 |
| Kaolin | 16 to 23 | for storage under tropical conditions:—

| | Percent by weight |
|---|---|
| Sodium sulphate (commercial) | 67 to 70 |
| Sodium fluoride | 10 to 15 |
| Sodium silico fluoride | 2 to 4 |
| Kaolin | 18 to 25 | for damaged or easily damaged skins:—

| | Per cent by weight |
|---|---|
| Sodium sulphate (commercial) | 50 to 60 |
| Sodium fluoride | 15 to 25 |
| Sodium silico fluoride | 2 to 4 |
| Kaolin | 20 to 30 | for shooting trophies, natural history and similar specimens:—

| | Per cent by weight |
|---|---|
| Sodium sulphate (commercial) | 40 to 50 |
| Sodium fluoride | 25 to 35 |
| Sodium silico fluoride | 2 to 5 |
| Kaolin | 23 to 30 | for generally unfavourable conditions of either climate or substance to be treated, or both:—

| | Per cent by weight |
|---|---|
| Sodium sulphate (commercial) | 30 to 40 |
| Sodium fluoride | 30 to 40 |
| Sodium silico fluoride | 2 to 5 |
| Kaolin | 25 to 35 |

If desiccated sodium sulphate be used instead of crystallized sodium sulphate (i. e. decahydrate or commercial sodium sulphate) the proportion thereof should be decreased relatively to those of the other ingredients so that the actual quantity of pure $Na_2SO_4$ present will remain the same.

The mixture of ingredients dissolved or suspended in a suitable quantity of water is applied to the inner surface of the hide or skin (i. e. that remote from the hair) e. g. by pouring, sprinkling or rubbing with or without the use of mechanical means or by dipping with the object of allowing a sufficient quantity of the liquid to come into contact with the pelt. Part will be absorbed by, and part will remain on the surface of, the skin; the part absorbed acts as a preventative against bacterial action whilst the part remaining on the surface affords mechanical protection as it is aseptic, a non-conductor of heat and forms a separating layer.

I claim:—

1. A process for preserving animal and vegetable substances consisting in treating said substances with an aqueous solution of sodium sulphate, and sodium fluoride (neutral or acid) with kaolin suspended therein, the quantity of sodium sulphate (in terms of the decahydrate) constituting at least 30% of the solid ingredients and the quantity of sodium fluoride at least 2% thereof.

2. A process for preserving animal and vegetable substances as claimed in claim 1 wherein the aqueous solution includes sodium silico fluoride.

3. A process for preserving animal and vegetable substances as claimed in claim 1 wherein the aqueous solution includes sodium silico fluoride and wherein the ingredients of the aqueous medium are present in the following proportions:

| | Per cent by weight |
|---|---|
| Sodium sulphate (commercial) | 30 to 85 |
| Sodium fluoride | 2 to 40 |
| Sodium silico fluoride | 0.25 to 5 |
| Kaolin | 12 to 35 |

JOHN BLEECK.